(No Model.) 2 Sheets—Sheet 1.

G. O. RENNERFELT.
SODA WATER APPARATUS.

No. 456,161. Patented July 21, 1891.

Witnesses:
Howard L. White
H. deVos.

Inventor:
Gustaf Otto Rennerfelt
By Richards
Attorneys.

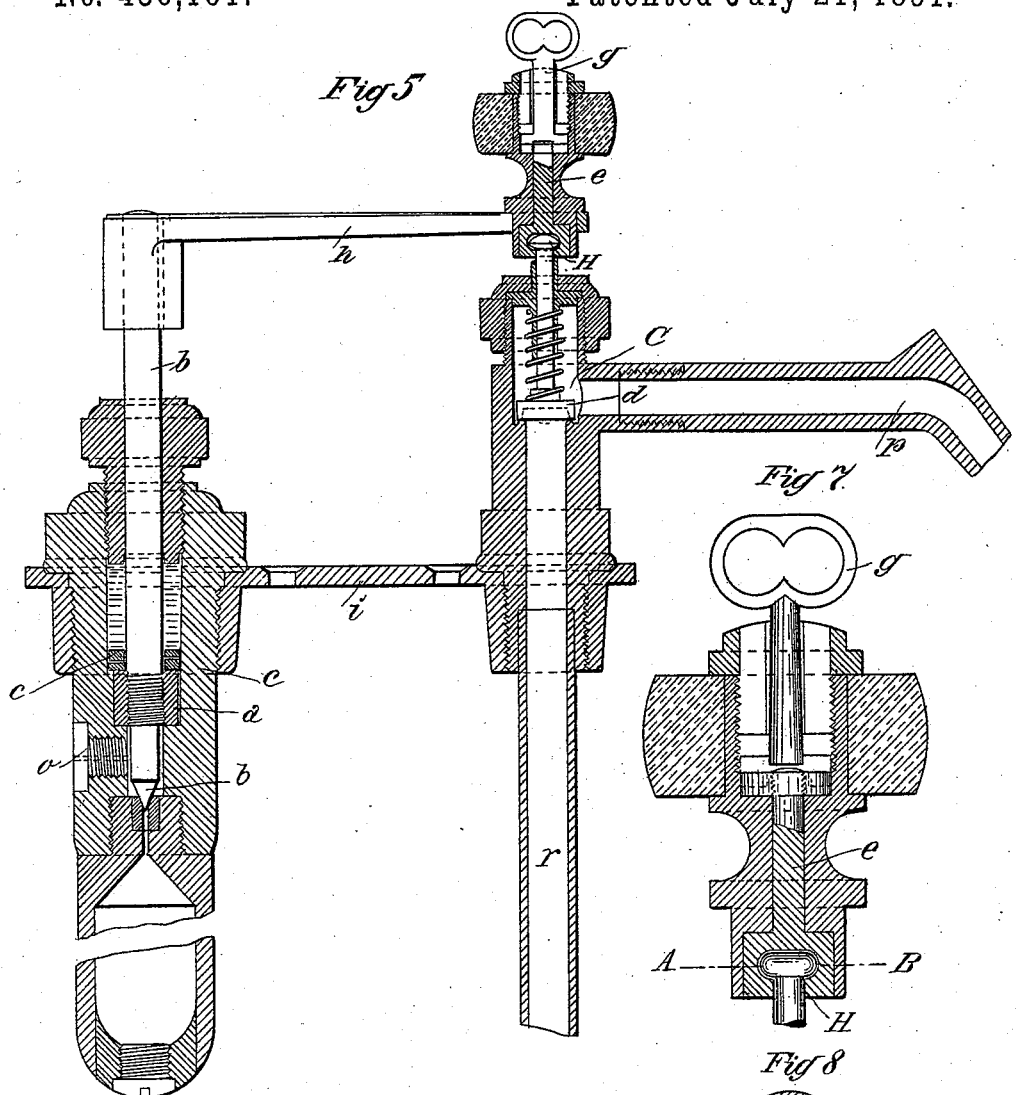

UNITED STATES PATENT OFFICE.

GUSTAF OTTO RENNERFELT, OF STOCKHOLM, SWEDEN.

SODA-WATER APPARATUS.

SPECIFICATION forming part of Letters Patent No. 456,161, dated July 21, 1891.

Application filed September 30, 1889. Serial No. 325,623. (No model.)

*To all whom it may concern:*

Be it known that I, GUSTAF OTTO RENNERFELT, a subject of the King of Sweden, residing at Stockholm, in the Kingdom of Sweden, have invented a new and useful Process and Apparatus for Making and Serving Aerated Drinks, of which the following is a full, clear, and exact description.

The object of this invention is to enable the public at large to prepare aerated drinks and to protect beer and refreshing drinks against the action of the air, and likewise to present a suitable apparatus for serving the said drinks.

It is obvious that all parts of the apparatus are made of such a material that the drink may not obtain any poisonous properties from the same. Thus, for instance, all parts made of iron or other metal are tinned with pure tin.

Figure 1:
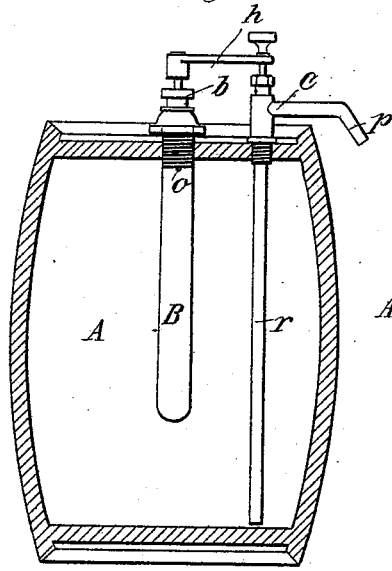
Figure 2:
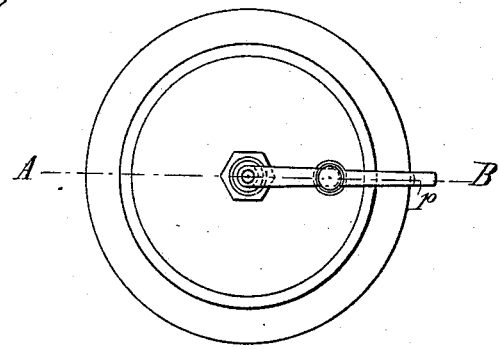
Figure 3:
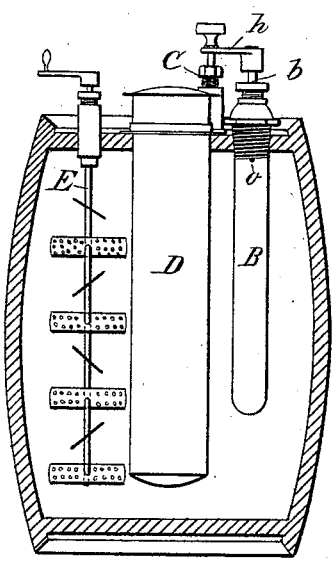
Figure 4:
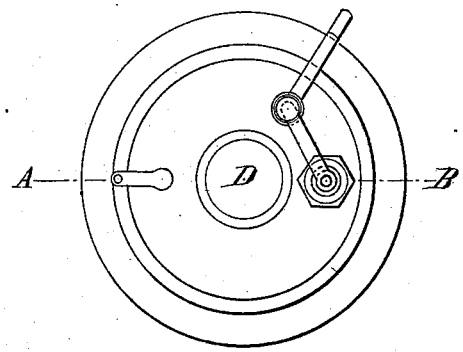

In the drawings which form a part of this specification, Figure 1 represents the apparatus adapted for serving the drink, in vertical section on the line A B of Fig. 2. Fig. 2 is a top view of the same. Figs. 3 and 4 show the same adapted for making and serving, in combination with a cooler and a stirring device, Fig. 3 being a vertical section on the line A B of Fig. 4. Figs. 5 and 6 show a section and a plan view of the reservoir for the carbonic acid, the discharge-cock of the apparatus, and how they are disposed on a common support, by means of which they are fixed to the vessel in which the drink is prepared or preserved. Fig. 7 shows in detail a disposition in section for closing the apparatus. Fig. 8 is a section on the line A B of Fig. 7.

A is the vessel containing the liquid to be treated with carbonic acid or to be served.

B is a reservoir for liquid carbonic acid.

*b* is a valve or cock for letting in the carbonic acid into the vessel A.

C is a discharge-cock for the liquid.

D, Figs. 3 and 4, is a cooling apparatus; E, a stirring device for promoting the absorption of the carbonic acid.

The valve or the cock *b* is provided with a handle *h*, which, when the apparatus is out of use and the valve or the cock is thus closed, rests and presses upon a knob H, connected with a valve in the discharge-cock C, so that the latter is kept closed, by which the liquid is prevented from flowing out, even though there should be some overpressure in the vessel A. When carbonic acid from the carbonic-acid reservoir B is to be let into the vessel A, the handle *h* of the valve *b* is turned, when the valve opens and the carbonic acid can get in through a little hole *o*. The valve in the discharge-cock C, previously closed by the handle *h*, can now, if there be sufficient pressure in the vessel A, open, when the liquid can flow out through the pipe *r* and the spout *p*. The hole *o* should be rather small, in order that the speed of emanation of the carbonic acid may in some way be regulated thereby and only so much gas be let into the vessel every time as corresponds to the quantity of the drink which at the same time flows out through the discharge-cock C. In this way no prejudicial overpressure can arise in the vessel A. For the sake of still more security against such a pressure the handle *h* should be somewhat elastic, so that the valve *d* may, if wanted, serve as a safety-valve. It is, in general, convenient to test the vessel A for a pressure of five atmospheres. The valve *b* of the carbonic-acid reservoir is, as shown, Fig. 5, a conical screw-valve, above the spindle-nut of which *a* is a strong spring *c*, to the effect that the handle *h* of the spindle, when the valve is to be closed, may always be turned to a determined position without needing to fear either that the valve be damaged or that it does not close sufficiently tight. The discharge-cock C of the apparatus, likewise shown by Fig. 5, has a valve *d*, which, as mentioned above, is likewise closed by a spring-pressure. This valve is provided with the aforesaid spindle-knob H, having for its purpose to lock the valve *d* in the manner shown in Figs. 7 and 8. The spindle-handle *h* is at the end provided with a spindle *e* to be turned, having at its lower part a cut or recess of the same shape as the knob H. This cut is open toward the one side, so that if the spindle *e* occupies its true position and the spindle-handle *h* is turned toward the button H this button can enter through the opening into the cut. By turning, then, the spindle *e* by means of a suitable key *g* the apparatus may be locked. The carbonic-acid reservoir and the discharge-valve are fixed on a common plate or support *i*, by which means they may simultaneously and easily be adapted to any vessel wanted, and then always maintain their mutual true position. As to the dimensions of the apparatus, it is evident that they may vary a great deal. However, it is convenient, if the apparatus is to be employed directly by private consumers, to give the vessel A a capacity of five to thirty liters. If, on the contrary, the apparatus is to be employed as a serving apparatus, its capacity should be thirty to five hundred liters. The capacity of the carbonic-acid reservoir with relation to that of the vessel A should be about as one is to four hundred.

Having now particularly described my invention, what I claim as new, and desire to secure by Letters Patent, is—

1. In an apparatus for aerated drinks, the combination of a vessel for the drink, a reservoir connected therewith for liquid carbonic acid, a screw-valve for closing said connection, having a handle $h$, and a discharge-valve for the liquid, which is engaged by said handle $h$, substantially as set forth.

2. The combination, with a support $i$, of a reservoir for liquid carbonic acid mounted thereon, a valve for closing said reservoir, having a handle $h$, a pipe $r$ and discharge-cock, also mounted on said support and having a valve within range of said handle, and a spring controlling said valve, the whole adapted to be applied to a cask or suitable drink-reservoir, substantially as set forth.

3. The combination of a drink-reservoir, a carbonic-acid reservoir adapted to communicate therewith, a valve controlling said communication, a handle for said valve, carrying a recessed locking-spindle, a discharge-valve for the drink-reservoir, having a head adapted to fit within said recess, and means for turning the locking-spindle to confine said head, substantially as set forth.

In witness whereof I have hereunto signed my name in the presence of two subscribing witnesses.

GUSTAF OTTO RENNERFELT.

Witnesses:
  NERE A. ELFWING,
  ERNST SVANGVIST.